US006433991B1

(12) United States Patent
Deaton et al.

(10) Patent No.: US 6,433,991 B1
(45) Date of Patent: Aug. 13, 2002

(54) CONTROLLING ACTIVATION OF DEVICES

(75) Inventors: Thomas M. Deaton, Houston; Dwayne D. Leismer, Pearland; Dennis M. Read, Manvel, all of TX (US)

(73) Assignee: Schlumberger Technology Corp., Sugar Land, TX (US)

( * ) Notice: Subject to any disclaimer, the term of this patent is extended or adjusted under 35 U.S.C. 154(b) by 0 days.

(21) Appl. No.: 09/496,448

(22) Filed: Feb. 2, 2000

(51) Int. Cl.[7] ................................................ H02H 47/00
(52) U.S. Cl. ....................................... 361/191; 166/65.1
(58) Field of Search ................................. 361/154, 191, 361/160; 166/369, 66.6, 66.7, 66.4, 65.1, 66.5, 72, 180, 104

(56) References Cited

U.S. PATENT DOCUMENTS

| | | | | |
|---|---|---|---|---|
| 3,814,376 A | | 6/1974 | Reinicke | |
| 4,161,215 A | | 7/1979 | Bourne, Jr. et al. | |
| 4,191,248 A | | 3/1980 | Huebsch et al. | |
| 4,424,865 A | | 1/1984 | Payton, Jr. | |
| 4,515,213 A | | 5/1985 | Rogen et al. | |
| 4,553,735 A | | 11/1985 | Brundage | |
| 4,566,534 A | | 1/1986 | Going, III | |
| 4,579,177 A | | 4/1986 | Going, III | |
| 4,619,320 A | | 10/1986 | Adnyana et al. | |
| 4,649,993 A | | 3/1987 | Going, III | |
| 4,667,736 A | | 5/1987 | Rumbaugh et al. | |
| 4,756,331 A | | 7/1988 | Stegmaier | |
| 4,796,708 A | | 1/1989 | Lembcke | |
| 4,840,346 A | | 6/1989 | Adnyana et al. | |
| 4,869,349 A | | 9/1989 | Minear et al. | |
| 4,886,114 A | | 12/1989 | Perkins et al. | |
| 4,890,815 A | | 1/1990 | Hascher-Reichl et al. | |
| 4,953,616 A | | 9/1990 | Borden et al. | |
| 4,959,567 A | | 9/1990 | Ealey et al. | |
| 4,981,173 A | | 1/1991 | Perkins et al. | |
| 5,020,036 A | | 5/1991 | Petermann et al. | |
| 5,070,944 A | | 12/1991 | Hopper | |
| 5,199,497 A | | 4/1993 | Ross | |
| 5,207,272 A | | 5/1993 | Pringle et al. | |
| 5,218,999 A | | 6/1993 | Tanimoto | |
| 5,226,491 A | | 7/1993 | Pringle et al. | |
| 5,230,383 A | | 7/1993 | Pringle et al. | |
| 5,236,047 A | * | 8/1993 | Pringle et al. | 166/369 |
| 5,267,589 A | | 12/1993 | Watanabe | |
| 5,293,551 A | * | 3/1994 | Perkins et al. | 361/154 |
| 5,318,268 A | | 6/1994 | Cox et al. | |
| 5,357,232 A | | 10/1994 | Suzuki et al. | |
| 5,361,053 A | | 11/1994 | Hosokawa et al. | |
| 5,375,811 A | | 12/1994 | Reinicke | |
| 5,389,845 A | | 2/1995 | Brimhall | |
| 5,444,324 A | * | 8/1995 | Priest et al. | 310/334 |

(List continued on next page.)

OTHER PUBLICATIONS

Andersen A., Herfjord H.J., Martinsen A.M., Sangesland S., Sivertsen A.; Feasibility Study of Shape Memory Alloys in Oil Well Applications; IKU Petroleum Research; Jun. 23, 1997, p. 79 and p. 92; IKU Sintef Group; Norway.
Ashley, Steven; Magnetostrictive actuators; Mechanical Engineering; Jun. 1998; pp. 68–70.

*Primary Examiner*—Ronald W. Leja
(74) *Attorney, Agent, or Firm*—Trop, Pruner & Hu P.C.

(57) ABSTRACT

An actuator assembly includes an operating actuator and a holding actuator that are engageable with an operator member of a device. The operating actuation is cycled between on and off states to move the operator member in incremental steps, and the holding actuator is maintained in an active state to maintain or latch the current position of the operator member. Each of the operating and holding actuators may include one of the following: a solenoid actuator; and an actuator including one or more expandable elements, such as a piezoelectric element, a magnetostrictive element, and a heat-expandable element.

49 Claims, 10 Drawing Sheets

U.S. PATENT DOCUMENTS 5,462,114 A * 10/1995 Catanese, Jr. ................ 166/53
5,501,425 A 3/1996 Reinicke et al.
5,535,828 A 7/1996 der Kinderen et al.
5,547,029 A * 8/1996 Rubbo et al. ............... 166/375
5,694,970 A 12/1997 Staranchuk
5,703,553 A 12/1997 Bushko et al.
5,818,680 A * 10/1998 Schmitz et al. ............. 361/160
5,868,375 A 2/1999 Reinicke et al.
5,911,362 A * 6/1999 Wood et al. ................... 239/1
6,015,266 A 1/2000 Swatek
6,021,095 A * 2/2000 Tubel et al. .................. 367/82
6,069,783 A * 5/2000 Mount et al. ............... 361/154
6,108,188 A * 8/2000 Denison et al. ............. 361/160
6,141,201 A * 10/2000 Schmitz et al. ............. 361/154
6,192,988 B1 * 2/2001 Tubel ......................... 166/313
6,321,845 B1 * 11/2001 Deaton ....................... 166/363

* cited by examiner

CONTROLLING ACTIVATION OF DEVICES

BACKGROUND

The invention relates to controlling activation of devices, such as downhole devices found in wellbores.

In a well, various devices may be activated to perform different tasks. Downhole devices may include valves (e.g., flow control valves or safety valves), perforating guns, and other completion components. Different forms of activation mechanisms, including hydraulic, mechanical, or electrical mechanisms, may be used. Mechanical activation typically involves lowering some type of setting or shifting tool to a desired depth to engage the downhole device to apply a force to move an actuator operably coupled to the downhole device. Hydraulic activation typically involves application of hydraulic pressure either through a tubing, a tubing-casing annulus, or a hydraulic control line to an actuator in a downhole device. Electrical activation typically involves communicating electrical power and/or signaling down an electrical cable, such as a wireline, an electrical control line, or other type of electrical line to a downhole actuator, which may include an electronic controller, a motor, or a solenoid actuator.

A solenoid actuator includes an electrical solenoid coil made up of a plurality of helically wound turns of an electrical wire. An armature that is typically constructed of a magnetic responsive material is positioned inside the solenoid. When an electrical current is run through the solenoid coil, a magnetic field is generated to move the armature in a desired direction. The movement of the armature may be used to actuate downhole devices.

Conventional solenoid actuators require relatively high levels of electrical power to perform the desired actuation. Such relatively large power requirements are due in part to the relatively large displacements of actuators to operate a downhole device. Electrical cables may run thousands to tens of thousands of feet to a device in a wellbore. Such long lengths of electrical cables are associated with large resistances in which power loss may be significant. Thus, communication of relatively high electrical currents may require use of heavy cabling as well as high capacity power sources at the well surface. This may increase costs associated with operation of a well.

Other types of actuator mechanisms, such as mechanical or hydraulic mechanisms, may also be associated with drawbacks. Mechanical actuation may require intervention or physical manipulation of downhole equipment, which may be time-consuming and impractical (such as in a subsea well). Communicating hydraulic pressure to certain parts of a well may be difficult, and any leaks in a hydraulic communications path may render a hydraulic actuation mechanism inoperable.

A need thus exists for actuators that are more efficient, reliable, and convenient to use.

SUMMARY

In general, according to one embodiment, an apparatus for operating a device includes at least first and second actuators activable by an input energy. An operator member is adapted to be moved in incremental steps by the first actuator and latched in its current position by the activable actuator.

Other embodiments and features will become apparent from the following description, the drawings, and the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

As used here, the terms "up" and "down"; "upper" and "lower"; "upwardly" and "downwardly"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate.

Figure 1:
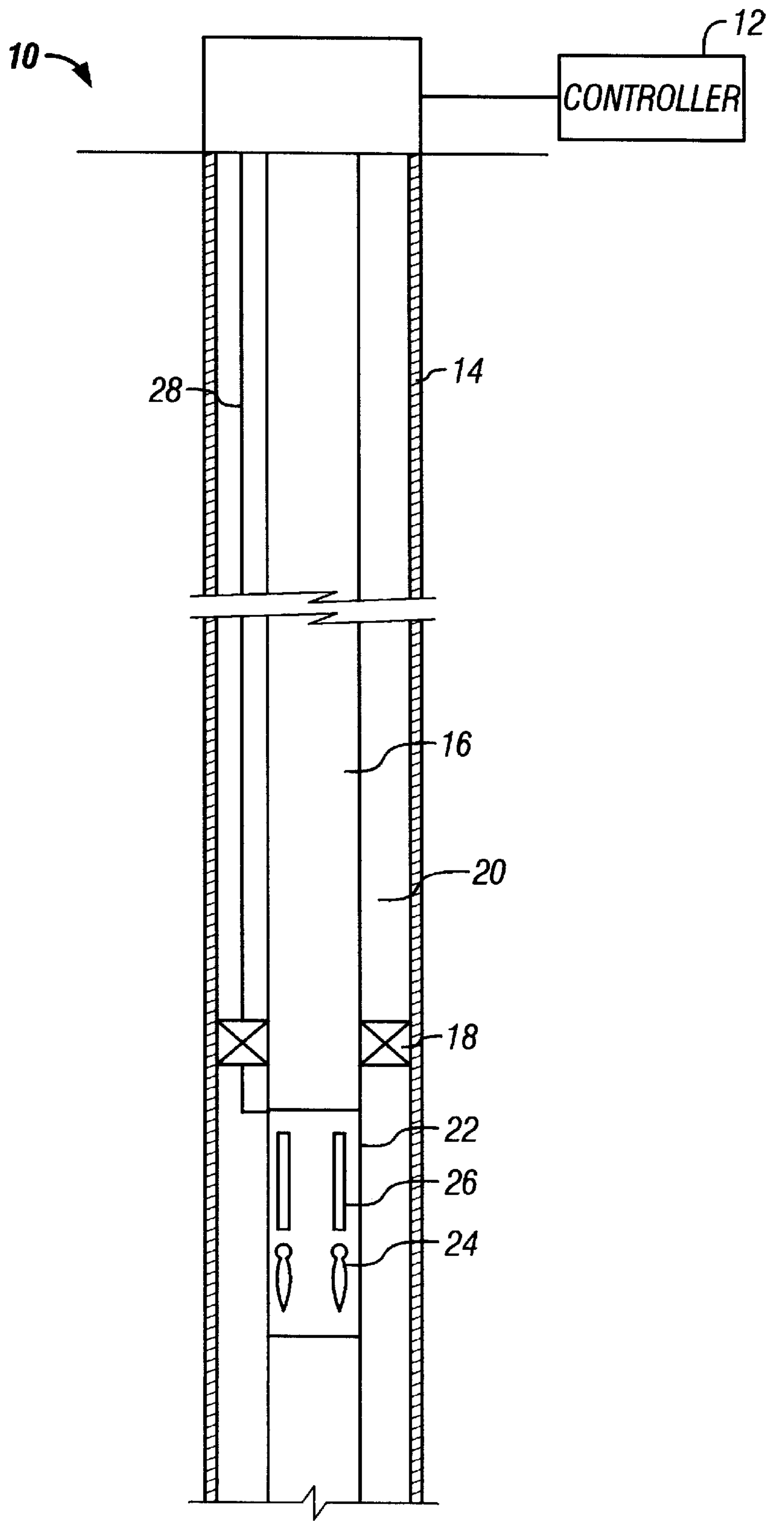
FIG. 1 illustrates an embodiment of a completion string having a subsurface safety valve in a wellbore.

Referring to FIG. 1, a completion string in accordance with one example embodiment is positioned in a wellbore 10. The wellbore 10 may be part of a vertical well, deviated well, horizontal well, or a multilateral well. The wellbore 10 may be lined with casing 14 (or other suitable liner) and may include a production tubing 16 (or other type of pipe or tubing) that runs from the surface to a hydrocarbon-bearing formation downhole. A production packer 18 may be employed to isolate an annulus region 20 between the production tubing 16 and the casing 14.

A subsurface safety valve assembly 22 may be attached to the tubing 20. The subsurface safety valve assembly 22 may include a flapper valve 24 or some other type of valve (e.g., a ball valve, sleeve valve, disk valve, and so forth). The flapper valve 24 is actuated opened or closed by an actuator assembly 26. During normal operation, the valve 24 is actuated to an open position to allow fluid flow in the bore of the production tubing 16. The actuator assembly 26 in the safety valve assembly 22 may be electrically activated by signals in an electrical cable 28 that runs up the wellbore 10 to a controller 12 at the surface. Other mechanisms for remote actuation of the actuator assembly 26 are also possible. The safety valve 24 is designed to close should some failure condition be present in the wellbore 10 to prevent further damage to the well.

Although the described embodiment includes an actuator used with a subsurface safety valve, it is contemplated that further embodiments may include actuators used with other types of downhole devices. Such other types of downhole devices may include, as examples, flow control valves, packers, sensors, pumps, and so forth. Other embodiments may include actuators used with devices outside the well environment.

In accordance with some embodiments, an actuator assembly includes at least a first actuator and a second actuator. The first actuator is adapted to move an operator member of a downhole device in incremental steps, while the second actuator is adapted to latch or maintain the operator member in its current position after each move. As used here, "operator member" refers to a member used to actuate, directly or indirectly, a downhole device. The operator member may be part of the actuator assembly, the downhole device, or another component.

The first actuator is alternately activated and deactivated at a predetermined frequency by cycling an activation energy between on and off states at the predetermined frequency. Each cycle of activation and deactivation of the first actuator moves the operator member by a predetermined incremental displacement. The first and second actuators may be associated with different frequency responses such that cycling of the activation energy at the predetermined frequency causes the first actuator to turn on and off but allows the second actuator to be maintained in an energized condition. Each of the first and second actuators may be associated with a time constant, with the time constant of the second actuator being greater than that of the first actuator.

The activation energy may be in the form of electric energy, magnetic energy, heat energy, infrared energy, microwave energy, and other forms of energy. Each of the first and second actuators may include one of the following: a solenoid actuator; an actuator containing an element formed of a material that expands in response to applied electrical, magnetic, infrared, microwave, or other energy; or other types of actuators. FIGS. 2, 3, 6, and 7 illustrate solenoid actuator assemblies according to some embodiments. FIGS. 8–12 illustrate actuator assemblies including expandable elements according to further embodiments.

Figure 2:
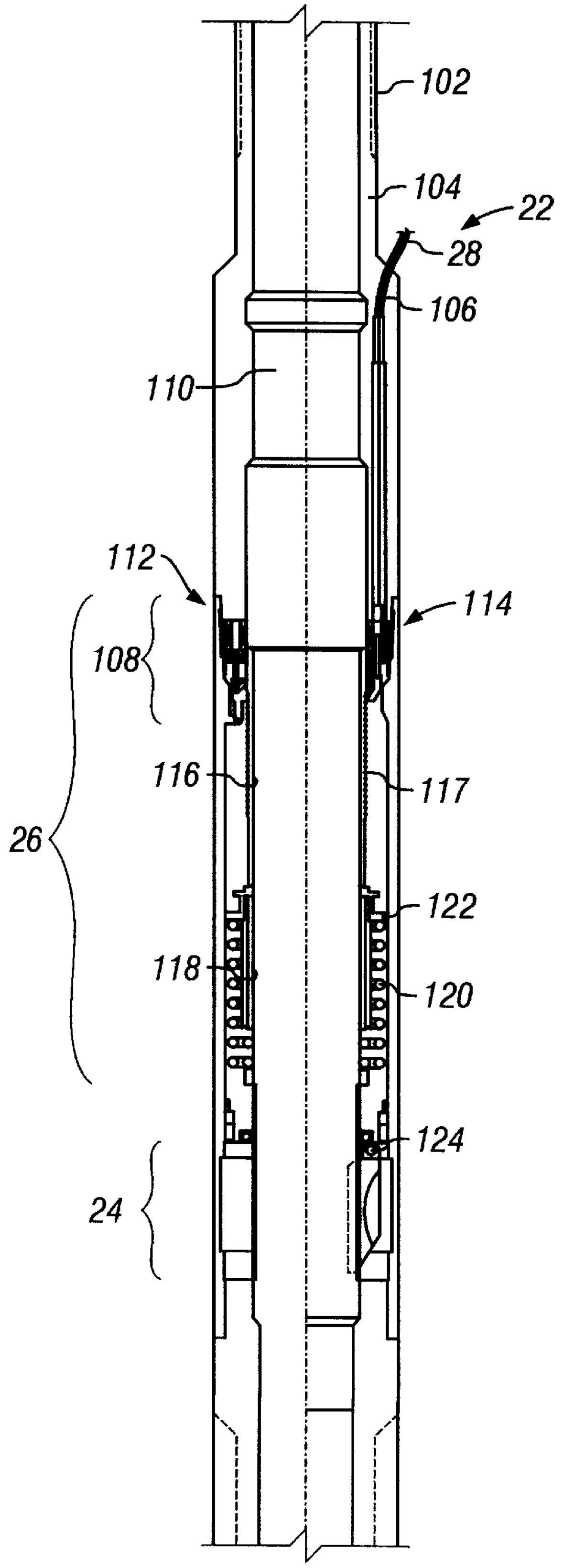
FIG. 2 is a longitudinal sectional view of a subsurface safety valve assembly including solenoid actuators in accordance with one embodiment.

Referring to FIG. 2, the subsurface safety valve assembly 22 in accordance with one embodiment is illustrated in greater detail. The safety valve assembly 22 includes a housing 104 having at its upper and lower ends threaded connections for connection to other downhole equipment, such as the production tubing 16. The housing 104 defines an inner bore 110 that is in communication with the bore of the production tubing 16 to enable fluid flow when the valve 24 is open. The housing 104 also defines a side conduit 106 in which electrical conductors may be run to an electrically-activable actuator mechanism 108 that is part of the actuator assembly 26. During normal operation of the well, the actuator assembly 26 maintains the valve 24 open to allow production fluids to flow through the bore 110 up to the production tubing 16.

In accordance with one embodiment, the electrically-activable actuator mechanism 108 includes at least two solenoid actuators 112 and 114. A solenoid actuator operates by generating a magnetic field in response to application of electrical energy to move a magnetic member, referred to as an armature. In further embodiments, other types of electrically-activable magnetic actuators may be employed.

Both the first and second solenoid actuators 112 and 114 are coupled to a ratchet sleeve 116. The outer circumference of the ratchet sleeve 116 has a teeth profile 117 that is engageable by the solenoid actuators 112 and 114. The lower end of the ratchet sleeve 116 is connected to a flow tube 118 that is adapted to operate the flapper valve 24 between an open or closed position. The flow tube 118 has an inner bore (that is coaxial with the bore 110 of the housing 104) in which fluid may flow. A spring 120 provides an upwardly acting force against a flange portion 122 connected to the flow tube 118. The spring 120 is designed to move the flow tube 118 upwardly to close the flapper valve 24 in the absence of an activation energy to the solenoid actuators 112 and 114. The flapper valve 24 rotates about a pivot 124. As shown in FIG. 2, the flapper valve 24 is in its open position. If the flow tube 118 is allowed to rise, the flapper valve 24 rotates about its pivot 124 to the closed position.

To open the flapper valve 24, electrical energy provided down the cable 28 is communicated to both the first and second solenoid actuators 112 and 114. The input electrical energy is cycled on and off and may be in the form of a square wave or sinusoidal signal. Another type of input signaling may include a train of pulses. Other types of signals may also be used in further embodiments. In accordance with one embodiment, the solenoid actuator 114 is adapted to move the ratchet sleeve 116 (and thereby the flow tube 118) downwardly in incremental steps. Each cycle of electrical energy applied in the cable 28 moves the ratchet sleeve 116 down by a predetermined incremental distance. Because the ratchet sleeve 116 and the flow tube 118 are moved by a relatively small distance, the electrical current level needed to operate the solenoid actuator 114 may be reduced to allow low power actuation of the subsurface safety valve assembly 22.

The solenoid actuator 112 is adapted to maintain the position of the ratchet sleeve 116 once it has been moved incrementally by the solenoid actuator 114. Thus, each cycle of electrical energy activates the solenoid actuator 114 to move the ratchet sleeve 116 down by the predetermined incremental distance, followed by deactivation of the solenoid actuator 114. The frequency response characteristics of the solenoid actuators 112 and 114 and the frequency of the input electrical signal are selected such that the solenoid actuator 114 turns on and off in response to the input signal but the solenoid actuator 112 remains in an activated state to maintain the position of the ratchet sleeve 116. By maintaining the solenoid actuator 112 activated and engaged to the ratchet sleeve 116, power may be removed from the solenoid actuator 114 to start the next actuation cycle. This continues until the ratchet sleeve 116 and flow tube 118 have moved downwardly by a sufficient distance to fully open the flapper valve 24. The actuator 114 may be referred to as an "operating actuator" while the actuator 112 may be referred to as a "holding actuator" or a "latching actuator."

Figure 3:
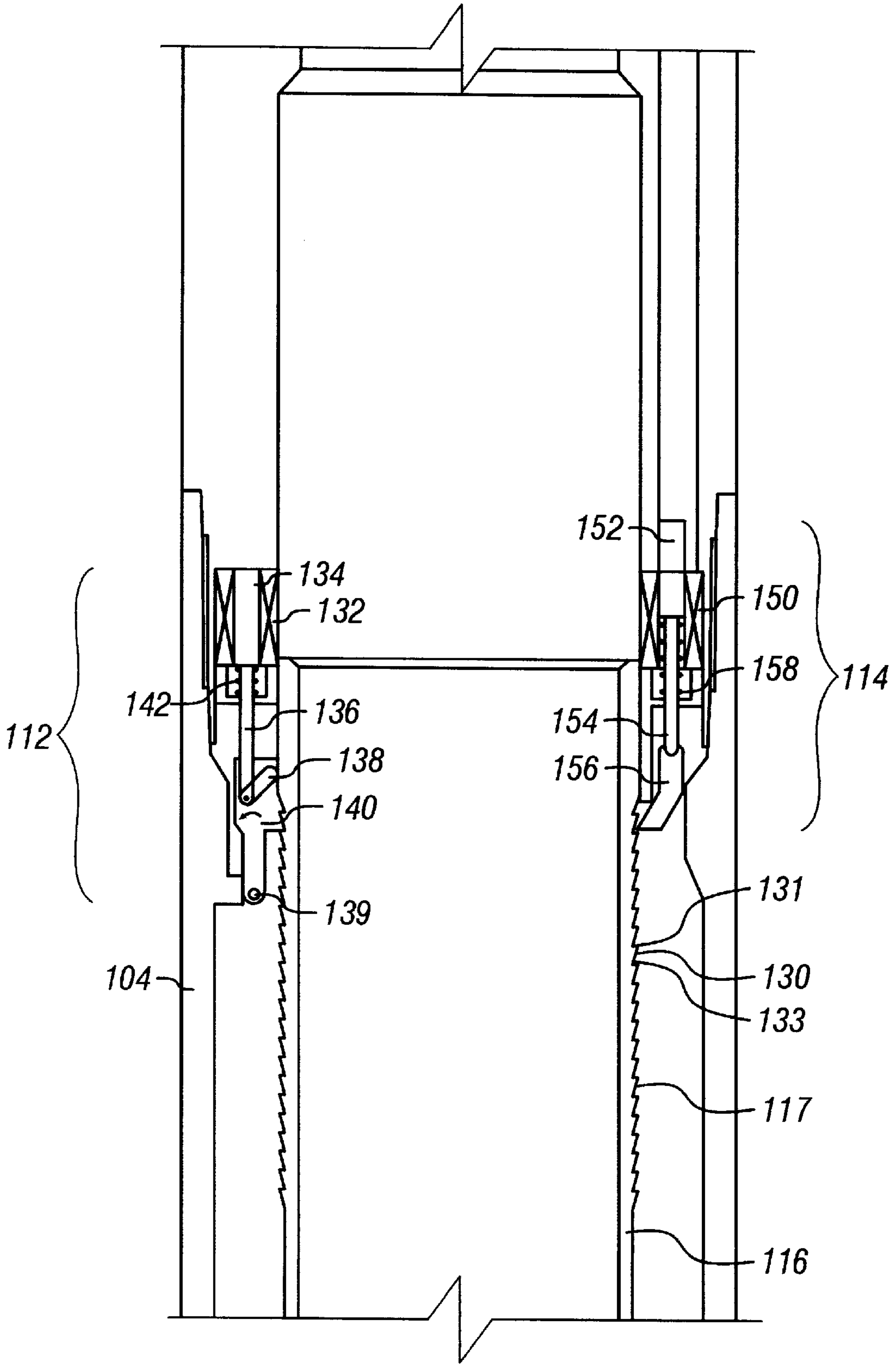
FIG. 3 is a more enlarged sectional view of a portion of the subsurface safety valve assembly of FIG. 2.

Referring further to FIG. 3, the solenoid actuators 112 and 114 and the ratchet sleeve 116 are illustrated in greater detail. The teeth profile 117 formed on the outer circumference of the ratchet sleeve 116 includes a plurality of teeth 130. Each tooth 130 is generally triangular in shape with a generally perpendicular (to the axis of the ratchet sleeve 116) edge 131 and a slanted edge 133 to provide a ratchet mechanism, as further described below.

The holding solenoid actuator 112 includes a solenoid coil 132 having an electrical wire that is wound a predetermined number of times to provide the desired magnetic force to move an armature 134 placed inside the solenoid coil 132. The armature 134, formed of a magnetic material, is longitudinally movable inside the solenoid coil 132. The armature 134 is connected to a control rod 136 that is connected to a hook 138 to move an engagement member 140 into or out of engagement with a tooth 130 of the ratchet sleeve 116. The lower end of the engagement member 140 is pivotally connected at a pivot 139 to the housing 104 of the safety valve assembly 22. When the control rod 136 is moved downwardly, the engagement member 140 is pushed (rotated) toward the tooth 130 to engage the ratchet sleeve 116. Upon engagement of the member 140 to a tooth 130 of the ratchet 116, the engagement member 140 is able to maintain the position of the ratchet sleeve 116. When power is removed from the solenoid coil 132, a spring 142 positioned in an annular space around the control rod 136 pushes the armature 134 upwardly to its initial reset position. Upward movement of the control rod 136 causes the engagement member 140 to disengage from the tooth 130 of the ratchet sleeve 116.

The operating solenoid actuator 114 includes a solenoid coil 150 having an electrical wire wound some predetermined number of times. An armature 152, formed of a magnetic material, is positioned in a bore of the solenoid coil 150. The lower end of the armature 152 is connected to a control rod 154, which in turn is connected to a ratchet engagement member 156. A spring 158 is provided in an annular space around the control rod 154 to push the armature 152 upwardly in the absence of a magnetic force provided by the solenoid coil 150.

Application of a current to the solenoid coil 150 causes generation of a magnetic force that moves the armature 152 downwardly. The downward movement of the armature 152 causes a corresponding downward movement of the control rod 154 and ratchet engagement member 156. The armature 152, control rod 154, and ratchet engagement member 156 are moved by a sufficient distance to engage a tooth 130 of the ratchet sleeve 116. The operating solenoid actuator 114 is designed to move the ratchet sleeve 116 by some predetermined distance with each cycle. The power requirement of the holding solenoid actuator 112 can be lower than the power requirement of the operating solenoid actuator 114 since the holding solenoid actuator 112 does not need to move the ratchet sleeve 116. This results in lower power requirements of the solenoid actuation mechanism 108.

As shown in FIG. 3, the operating solenoid actuator 112 is in the engaged position and the holding solenoid actuator 114 is in the disengaged position. This, however, does not necessarily reflect actual operation of the solenoid actuators 112 and 114, since presence of an input activation energy may activate both actuators in one embodiment. However, in a further embodiment, separate input signals may be provided to the actuators 112 and 114 for independent control.

In another embodiment, a pair of solenoid mechanisms may be used to control communication of fluid pressure to an operator member that can be actuated by the fluid pressure. For example, the operator member may be in communication with a fluid chamber, with a first solenoid mechanism pumping fluid into the fluid chamber and a second solenoid mechanism maintaining the pressure of the fluid chamber (such as by closing off a release or vent port). The fluid pressure in the fluid chamber may be incrementally increased by the first solenoid mechanism through a check valve leading into the fluid chamber.

In operation of the FIGS. 2 and 3 embodiment, to open the flapper valve 24, an input signal is applied down the electrical cable 28 to the solenoid actuators 112 and 114 to energize both solenoid coils 132 and 150. As a result, the armatures 134 and 152 and respective control rods 136 and 154 are moved downwardly to engage the ratchet engagement members 140 and 156 to the next tooth 130 of the ratchet sleeve 116. Continued application of current down the cable 28 causes the armature 152 in the operating solenoid actuator 114 to move downwardly to move the ratchet sleeve 116 by a predetermined incremental distance. Power may then be removed from the cable 28 followed by the next activation/deactivation cycle a predetermined time period later.

The solenoid coils 112 and 114 may be designed with different time constants to provide for different frequency responses. For example, the inductance of the solenoid coil 132 may be relatively large to provide a large time constant. On the other hand, the inductance of the solenoid coil 150 may be less than the inductance of the solenoid coil 132 to provide a smaller time constant. Time constants may also be varied by varying resistance and capacitance values. The different time constants of the solenoid coils 132 and 150 enable different frequency responses of the solenoid coils. Thus, if an input signal is cycled at a predetermined rate that is greater than the time constant of the solenoid coil 150 but less than the time constant of the solenoid coil 132, power can be cycled to activate and deactivate the solenoid coil 150 (associated with the operating actuator 114) while the solenoid coil 132 (associated with the holding actuator 112) remains energized.

When the holding actuator 112 is energized, it prevents upward movement of the ratchet sleeve 116 to prevent resetting of the valve assembly 22 when power is removed to deactivate the operating actuator 114 during the inactive portion of an input signal cycle. Due to the slanted edges 133 of the teeth 130, the operating actuator 114 can continue to move the ratchet sleeve 116 downwardly in incremental steps even though the holding actuator 112 is engaged to the ratchet sleeve 116. Downward shifting of the ratchet sleeve 116 allows the holding actuator 112 to engage successive teeth 130 in the teeth profile 117 until the operating actuator 114 has moved the valve 24 to the open position.

Figure 4A:
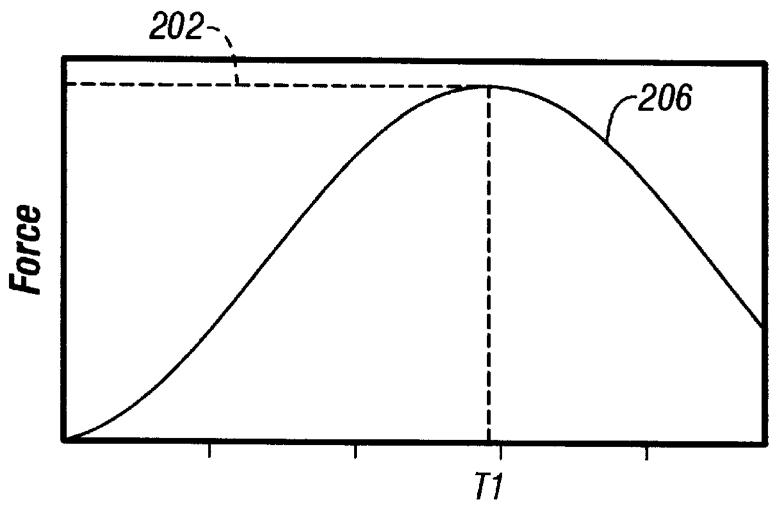
FIGS. 4A–4D are timing diagrams of an input signal and waveforms showing activation of the actuators of FIG. 3.
Figure 4B:
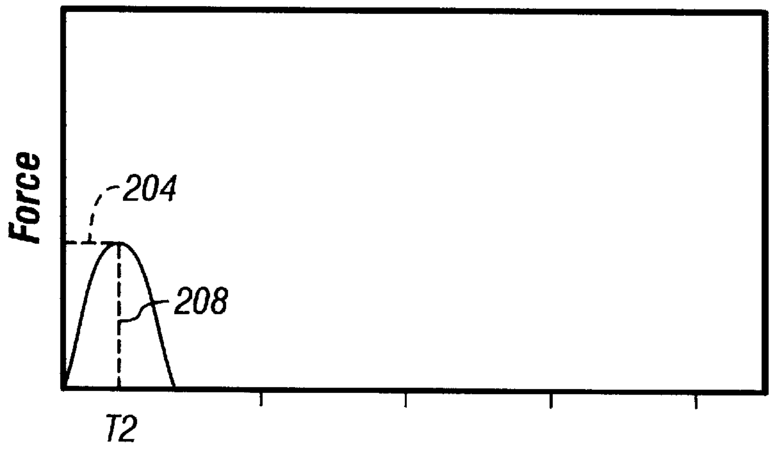
Figure 4C:
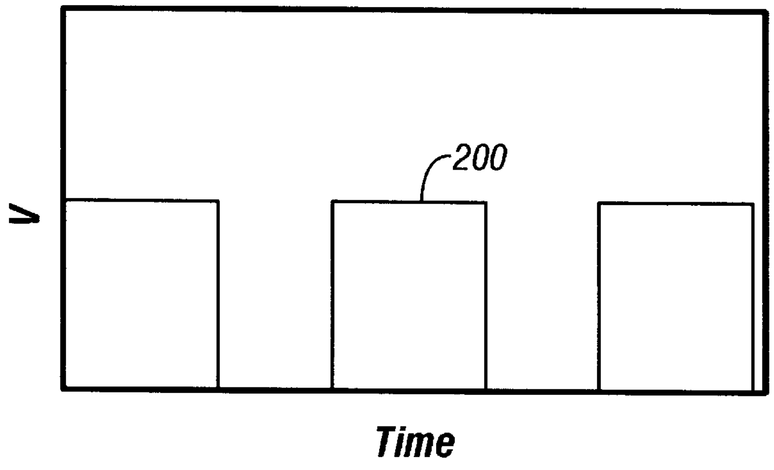
Figure 4D:
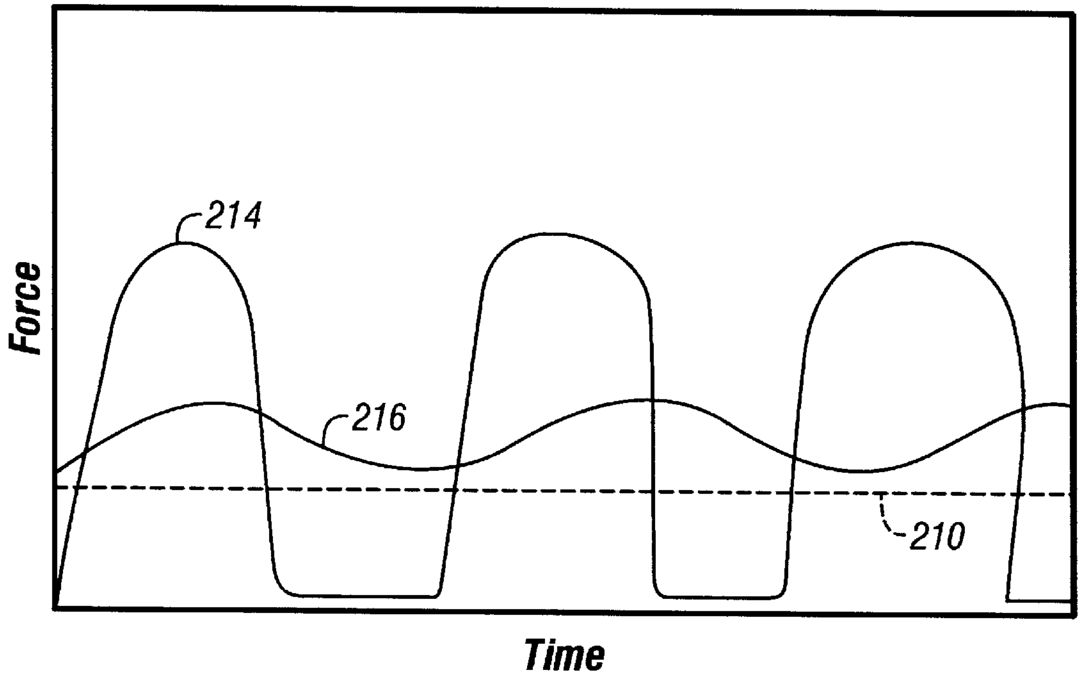

Referring to FIGS. 4A–4B, the frequency responses of the solenoid actuators 112 and 114 are illustrated. FIG. 4A shows the frequency response of the solenoid coil 132 in the holding solenoid actuator 112 in response to an input signal 202 having a pulse width TI (e.g., about one second), and FIG. 4B shows the frequency response of the solenoid coil 150 in the operating solenoid actuator 114 in response to an input signal 204 having a pulse width T2 (e.g., about 0.3 seconds). Waveform 206 represents the magnetic force provided by the solenoid coil 132, while waveform 208 represents the magnetic force provided by the solenoid coil 150. Referring further to FIGS. 4C and 4D, if the frequency of an input signal 200 (FIG. 4C) is selected properly, then the magnetic force (214) provided by the solenoid coil 150 can be activated and deactivated with cycling of the input signal 200 while the magnetic force (216) of the solenoid coil 132 remains above a threshold level 210 to maintain the holding solenoid actuator 112 in an energized state.

In other embodiments, more than one operating solenoid and more than one holding solenoid may be employed to operate one or more operator members. Also, instead of an alternating input signal, direct current (DC) activation signals may be employed. The operating and holding actuators may be activated at different DC voltage levels to provide similar control. Further, instead of a holding solenoid actuator as described above, other embodiments may include mechanical retainer elements to hold the position of an operator member.

Figure 5:
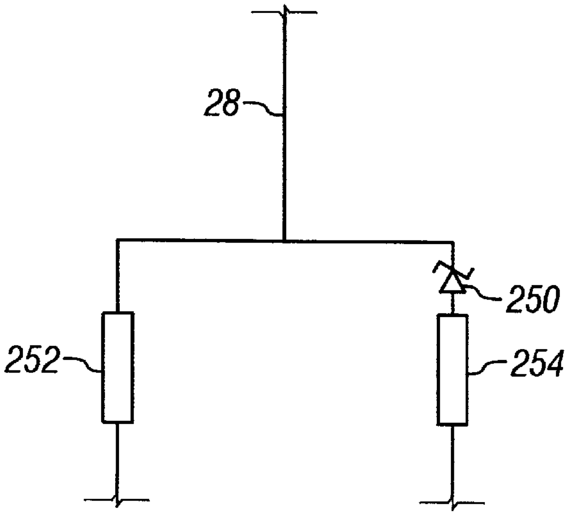
FIG. 5 is a circuit diagram showing one of the solenoid actuators of FIG. 2 connected to an electrical cable through a Zener diode in accordance with an alternative embodiment.

Referring to FIG. 5, in a variation of the embodiment described in FIGS. 2 and 3, a Zener diode 250 may be used to provide selection of solenoids. In this other embodiment, a holding solenoid 252 (associated with a holding actuator) may be also generally of relatively high impedance to reduce power requirements and to provide for selection of solenoids. The holding solenoid 252 is wired directly to an electrical conductor connected to the cable 28 from the surface. An operating solenoid 254 (associated with an operating actuator) is connected to the same circuit through the Zener diode 250. As power is applied, voltage across the system rises. When a specific level is reached, the holding solenoid 252 is first energized. At this first power level, the Zener diode 250 prevents power from being applied to the operating solenoid. As the voltage is increased further, the avalanche point of the Zener diode 250 may be passed and power flows to both solenoids 252 and 254. By varying the applied voltage with time from above to a DC bias below the threshold of the Zener diode 250, the operating solenoid 254 is cycled between on and off states while the holding solenoid 252 remains energized.

Actuator assemblies have been described that have relatively low instantaneous electrical power requirements. The low power is achieved by moving an operator member in incremental steps, thus reducing the instantaneous current level since the amount of actuator movement is reduced. The incremental stepping of the operator member is achieved by using an operating actuator to move the operator member by incremental distances and using a holding actuator to maintain a current position of the operator member when the operating actuator is deactivated to start a subsequent activation cycle.

Figure 6:
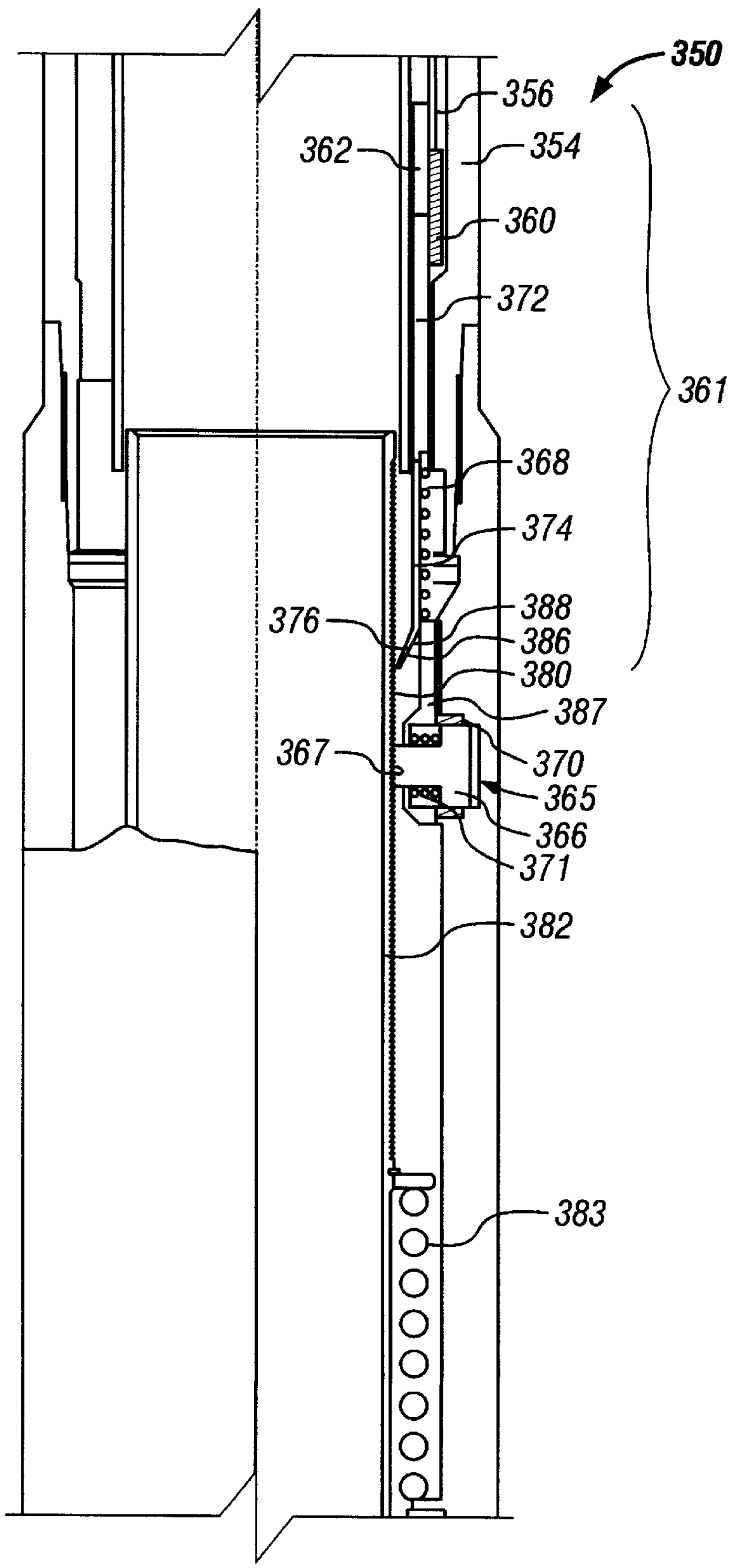
FIGS. 6 and 7 are longitudinal sectional views of portions of a subsurface safety valve assembly in accordance with another embodiment.
Figure 7:
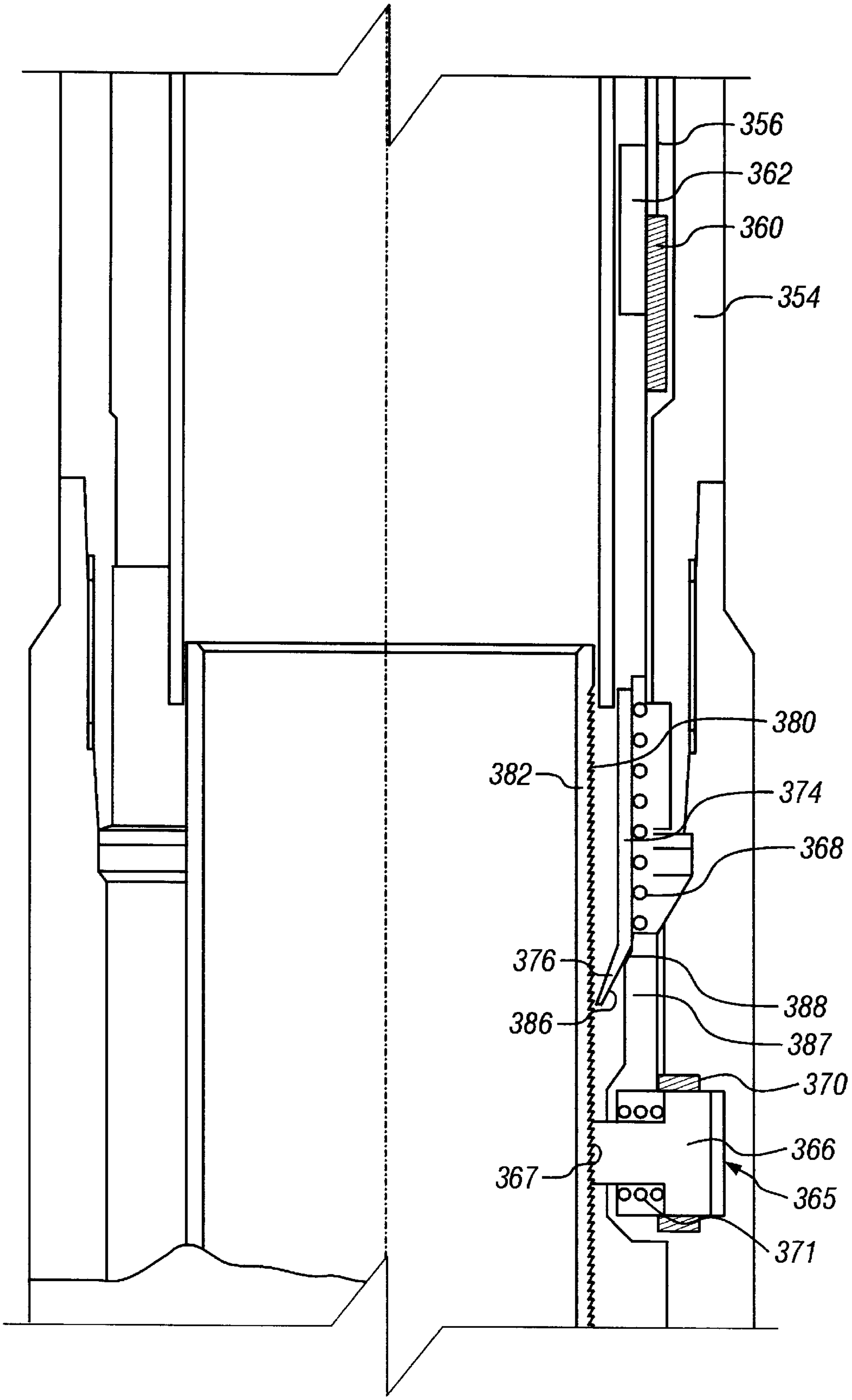

Referring to FIGS. 6 and 7, a portion of a subsurface safety valve assembly 350 in accordance with another embodiment is illustrated. A housing 354 of the subsurface safety valve assembly 350 includes a port (not shown) adapted to receive an electrical cable 356 (which may be run from the surface). The electrical cable 356 runs to a solenoid coil 360. An armature 362, formed of a magnetic material, is positioned adjacent the solenoid coil 360. When electrical current is provided down the electrical cable 356 to the solenoid coil 360, a magnetic force is generated by the solenoid coil 360 to move the armature 362. The solenoid coil 360 and the armature 362 are part of an operating solenoid actuator 361. The armature 362 is built into the wall of a mandrel 372 moveable in the axial direction. Thus, movement of the armature 362 causes a corresponding movement of the mandrel 372. As shown in greater detail in FIG. 7, the lower end of the mandrel 372 is attached to an actuator member 374. The actuator member 374 has an angled tip 376 adapted to engage a teeth profile 380 formed in the outer circumference of a flow tube 382. In FIGS. 6 and 7, the actuator member 374 is shown in its disengaged position. The flow tube 382 is moveable axially to open or close a flapper valve (not shown) or some other type of valve. To open the flapper valve, the flow tube 382 is moved downwardly against an upward force supplied by a spring 383.

In the illustrated embodiment, the lower end of the actuator member 374 has an angled surface 386 adapted to abut against an angled surface 388 of an element 387. When the armature 362 is moved downwardly, the angled surfaces 388 and 386 are contacted, which pushes the angled tip 376 radially inwardly to engage the teeth profile 380. Downward movement of the mandrel 372 also compresses a spring 368. When compressed, the spring 368 applies an upward force against the lower end of the mandrel 372. Thus, if power is removed from the solenoid coil 360, the spring 368 can reset the armature 326, mandrel 372, and actuator member 374 back to their initial position (to allow a subsequent cycle of activation energy to actuate the armature 362, mandrel 372, and actuator member 374.

The electrical cable 356 also is connected to a solenoid coil 370 that is part of a holding actuator 365. An armature 366 is positioned inside the solenoid coil 370. When activated, the solenoid coil 370 applies a magnetic force to push the armature 366 radially inward against the teeth profile 380 on the outer surface of the flow tube 382. A spring 371 applies a force to push the armature 366 back to its original position if power is removed from the solenoid coil 370. One end of the armature 366 has a profile 367 that is adapted to engage the teeth profile 380 of the flow tube 382.

Similar to the solenoid actuators in FIGS. 2 and 3, the operating solenoid actuator 361 may be designed to have a smaller time constant than the holding solenoid actuator 365. This allows the operating solenoid actuator 361 to be cycled on and off while the holding actuator 365 holds the flow tube 382 in its current position. In the design employing DC activation signals, the operating and holding solenoids can be selected to have different DC voltages, which results in a similar effect.

In operation, an input signal, which may be a square wave signal or a sinusoidal signal, is supplied down the cable 356. The first pulse of the input signal is long enough to activate both the operating and holding solenoid actuators 361 and 365. Thereafter, the input signal is cycled between on and off states at a predetermined frequency such that the operating solenoid actuator 361 can be cycled on and off while the holding actuator 365 remains on. When the operating solenoid 360 is activated, the armature 362 and mandrel 372 are moved downwardly. This causes the actuator member 374 and angled tip 376 to engage the teeth profile 380 of the flow tube 382 and to move the flow tube 382 downwardly. During the off portion of each cycle of the input signal, the solenoid coil 360 is deactivated to allow the spring 368 to push the armature 362, mandrel 372, actuator member 374, upwardly. A next activation cycle may be provided to again move the flow tube 382 down by another predetermined incremental distance. The activation cycles are repeated until the flapper valve is opened.

Figure 8:
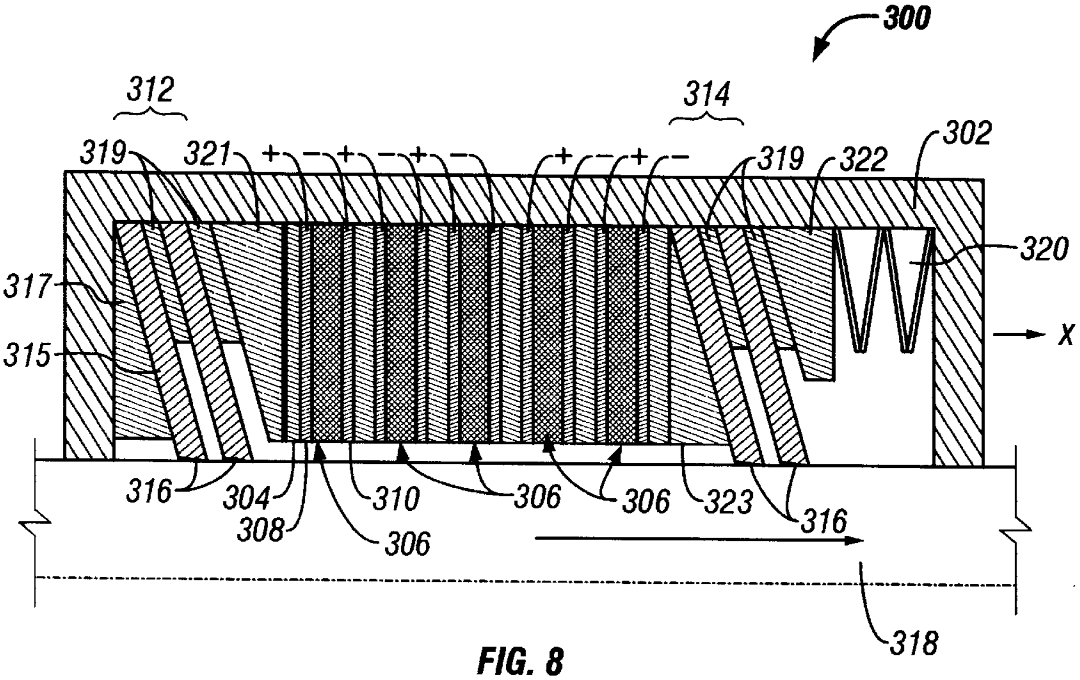
FIG. 8 illustrates an actuator having piezoelectric elements that are expandable in response to an applied input voltage in accordance with a further embodiment.

In alternative embodiments, instead of using solenoid actuators, actuators with expandable elements may be used to move an operator member in a downhole device. When the expandable element in the actuator expands, the operator member may be caused to move in a desired direction. Referring to FIG. 8, an actuator 300 includes piezoelectric elements each expandable by application of an electrical voltage across the element. The actuator 300 may be referred to as a piezoelectric linear motor. One type of piezoelectric material is lead zirconate titanate. Another type of piezoelectric material includes $BaTiO_3$. Generally, the change in length of a piezoelectric material is proportional to the square of the applied voltage.

A housing 302 in the actuator 300 contains layers of conductors 308, 310, insulators 304, and piezoelectric disk 306. Each piezoelectric disks 306 is sandwiched between a first conductor plate 308 and a second conductor plate 310, with the conductor plates 308 and 310 coupled to an input voltage. The insulator layers are placed between adjacent conductors 308, 310 to provide electrical isolation. To activate the actuator 300, the input voltage is applied to the conductor plates 308 and 310. This causes the piezoelectric disks 306 to expand in an axial direction, generally indicated as X.

The actuator 300 includes a first ratchet mechanism 312 (referred to as a static or holding ratchet mechanism) and a second ratchet mechanism 314 (referred to as an operating ratchet mechanism). In one embodiment, each of the ratchet mechanisms 312 and 314 may include Belleville springs 315 each arranged at an angle such that sharp tips 316 of the Belleville springs 315 can grip the outer wall of a shaft 318 that is part of the operator member of a downhole device. Instead of Belleville springs 315, other forms of engagement tablets may be used to engage the shaft 318. Spacers 317, 321, 323, and 322 having generally triangular shapes are positioned to arrange the Belleville springs 315 at the desired angle with respect to the outer surface of the shaft 318. Spacers 319 are placed between adjacent Belleville springs 315. A spring 320 placed between the spacer 322 and applies a force against the spacer 322 in a general direction opposite to the X direction.

In operation, an input activation voltage that cycles between an on state and an off state is applied to the actuator 300. Application of the activation voltage causes the piezoelectric disks 306 to expand to move the operating ratchet mechanism 314 so that the shaft 318 is moved by a predetermined incremental distance. Removal of the activation voltage causes the piezoelectric disks 306 to contract so that the operating ratchet mechanism 314 is moved backward by action of the spring 320. The shaft 318, however, is maintained in position by the static or holding ratchet mechanism 312. Subsequent cycles of the activation voltage causes the shaft 318 to move forward (in generally the X direction) by incremental steps. This provides a simple "inch worm" type of linear motor.

Figure 9:
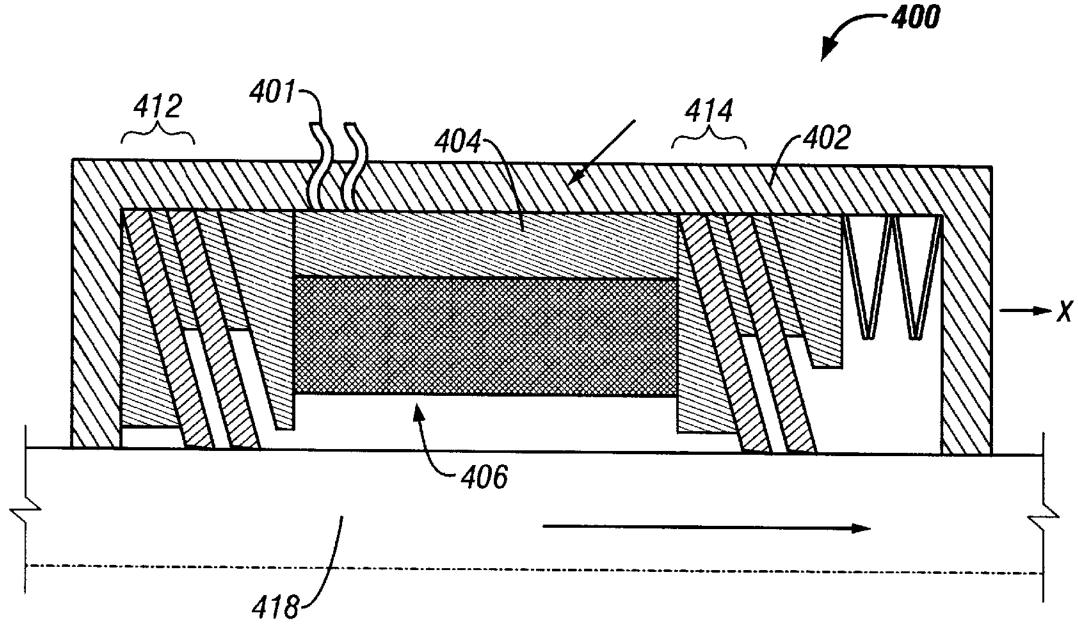
FIG. 9 illustrates an actuator having a magnetostrictive element that is expandable in response to an applied magnetic field in accordance with another embodiment.

Referring to FIG. 9, in accordance with another embodiment, an actuator 400 includes an expandable element formed of a magnetostrictive material that changes its dimensions in response to an applied magnetic field. One example of a magnetostrictive material is Terfenol-D, which is a special rare-earth iron material that changes its shape in response to an applied magnetic field. Terfenol-D is a near-single crystal of the lanthanide elements terbium and dysprosium plus iron. Another type of magnetostrictive material includes nickel or nickel alloy.

The actuator 400 includes a housing 402 containing a static ratchet mechanism 412 and an operating ratchet mechanism 414, similar to mechanisms 312 and 314 in FIG. 8. However, instead of piezoelectric disks 306, the actuator 400 includes a magnetostrictive cylinder 406 that is surrounded by a solenoid coil 404 connected to electrical wires 401. Application of electrical energy into the coil 404 causes generation of a magnetic field. In response to the presence of the magnetic field, the magnetostrictive cylinder 406 expands in generally the X direction (as well as in other directions). Expansion of the magnetostrictive cylinder 406 causes movement of the operating ratchet mechanism 414 to move the shaft 418 by an incremental step.

Figure 10:
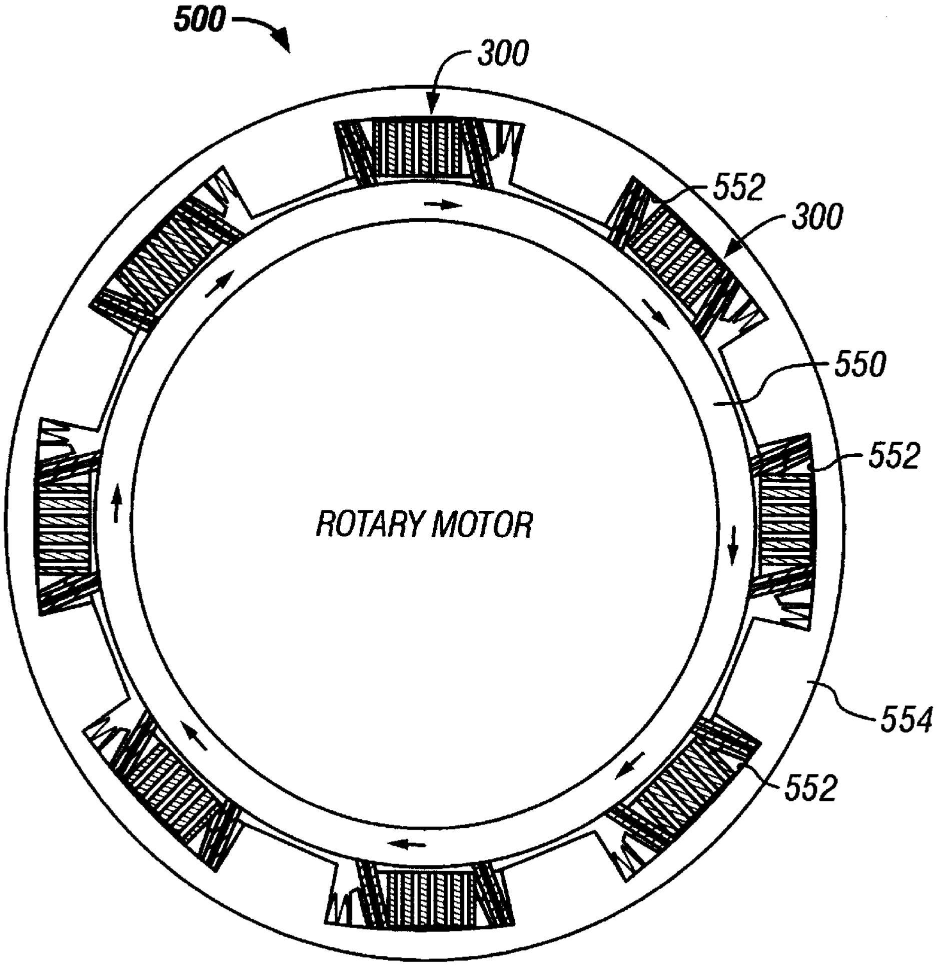
FIGS. 10 and 11 illustrate a rotary motor employing actuators of FIG. 7.
Figure 11:
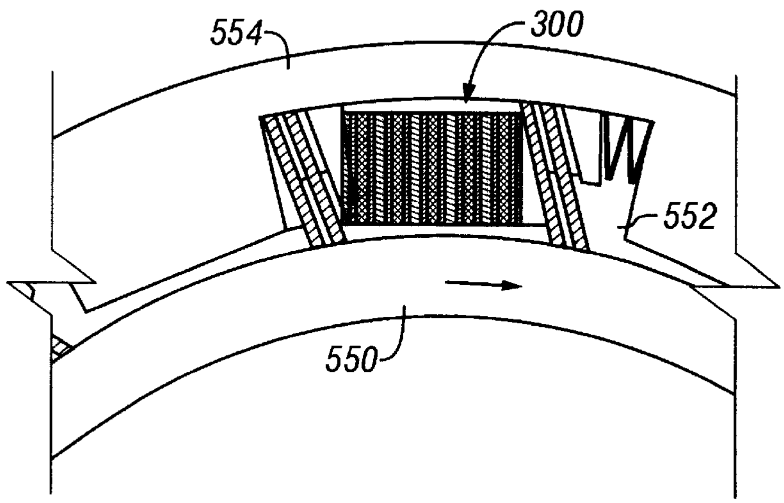

Referring to FIGS. 10 and 11, in accordance with another embodiment, a plurality of actuators 300 (or alternatively, actuators 400) may be used to rotate a cylindrical sleeve 550 to provide a rotary-type motor 500. The plurality of actuators 300 may be positioned in cavities 552 formed in a housing 554 of the motor 500. In the illustrated embodiment, the actuators 300 are arranged around the outer circumference of the sleeve 550. The number of actuators 300 used depends upon the desired actuation force. Input signals provided to the actuators 300 in the illustrated arrangement causes clockwise rotation of the sleeve 550. A different arrangement of the actuators 300 may rotate the sleeve 350 in the opposite direction. In a further embodiment, the actuators 300 may be arranged to contact the inner wall of the sleeve 550.

Figure 12:
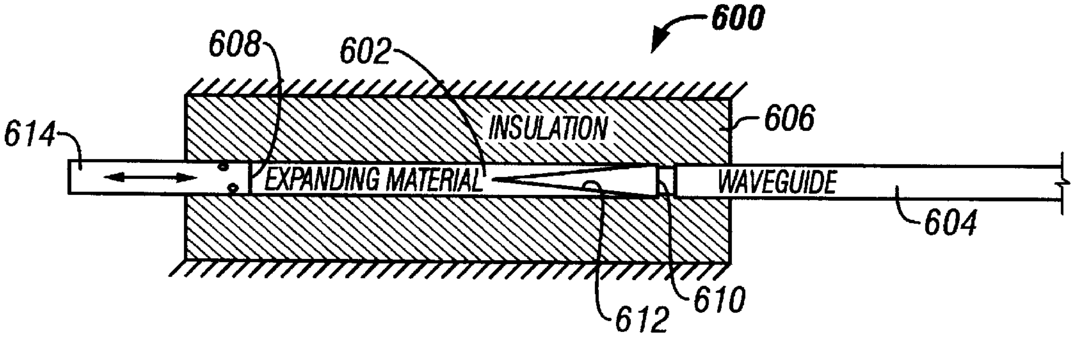
FIG. 12 illustrates an actuator having a heat-expandable element in accordance with yet a further embodiment.

Referring to FIG. 12, in accordance with yet another embodiment, an actuator 600 includes an expandable element 602 that is expanded by application of some type of heat energy, such as infrared energy or microwave energy. Examples of heat-expandable materials include aluminum, shape-memory alloys (e.g., Nitinol), and other materials. The infrared or microwave energy may be propagated down a waveguide 604. The expandable element 602, generally tubular in shape, is positioned inside a bore of a cylindrical insulator 606 that provides heat insulation. One end 610 of the expandable material 602 is exposed to an end of the waveguide 604. A generally conical cut 612 is formed proximal the end 610 of the expandable element 602 to increase the surface area that is exposed to energy propagated down the waveguide 604.

The other end 608 of the expandable element 602 is in abutment with an output rod 614, which is formed of an insulating material. The output rod 614 is part of an operator member for a device to be actuated. To activate the actuator 600, infrared or microwave energy is propagated down the waveguide 604, which may be routed down a control line from the surface, to heat up the expandable element 602. Heating the expandable element 602 causes expansion in the axial direction to move the output rod 614. A spring (not shown) may be provided to apply a force against the expandable element 602 so that, when energy is removed from the waveguide 604 and the expandable element 602 is allowed to cool, the spring may move the output rod 614 back as the expandable element 602 contracts.

The actuator 600 as shown in FIG. 12 can be used in pairs, with one being an operating actuator and the other one being a holding actuator. Thus, much like the solenoid actuator embodiment discussed in connection with FIGS. 2 and 3, the operating actuator may be used to move an operator member in incremental steps, as the input energy is cycled between on and off states. The holding actuator is designed to remain activated to maintain or latch the current position of the operator member. Similar to the solenoid actuator, the heat-expandable elements 602 in the operating and holding actuators 600 may be designed to have different time constants. This may be performed by varying the mass of the expandable element 602. Alternatively, the amount of insulation 606 may be varied to vary the time constant. Thus, as the heat energy provided down the waveguide 604 is periodically activated and deactivated, the heat-expandable element 602 of the operating actuator responds by expanding and contracting. However, the expandable element 602 of the holding actuator remains in an expanded condition since it is designed to have a larger time constant and thus requires a longer time to respond to the change in input energy.

Similarly, the actuators 300 and 400 containing the piezoelectric and magnetostrictive elements, respectively, may be used in pairs (operating and holding actuator pairs). The designs of the actuators 300 and 400 may be modified by removing the static ratchet mechanism (312 and 412, respectively) in each. Further, the operating ratchet mechanism (314 or 414) may be modified so that expansion and contraction of the expandable element 306 or 406 moves the operating ratchet mechanism 314 and 414 into or out of engagement with the operator member of the device to be actuated.

Figure 13:
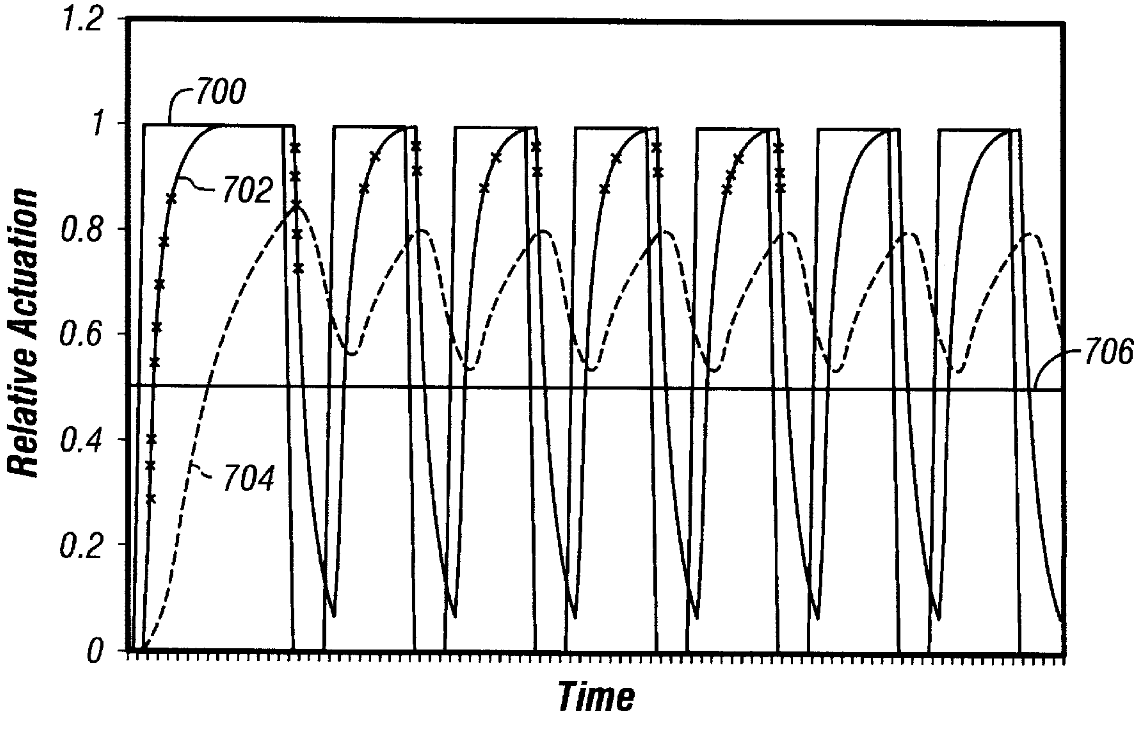
FIG. 13 is a timing diagram including an input signal and waveforms representing activation of any one of the actuators of FIGS. 8, 9, and 12.

Referring to FIG. 13, various waveforms representing an input activation energy and relative actuation states of operating and holding actuators (e.g., pairs of actuators 300, 400, or 600) are illustrated. An input signal 700 having a square waveform is provided, which may represent electrical energy, magnetic energy, infrared energy, microwave energy, or another form of energy. The duration of the initial pulse of the input signal 700 is larger than subsequent pulses to activate both the operating and holding actuators. The activation of the operating actuator is shown by waveform 702, while the activation of the holding actuator is shown by the waveform 704. Because the time constant of the holding actuator is larger than that of the operating actuator, it takes a longer time for the holding actuator to activate. A threshold level 706 shows the threshold above which the actuators are considered to be activated. After the initial larger pulse, the input signal 700 is subsequently cycled between on and off states at a predetermined frequency. This activates and deactivates the operating actuator, as shown by the waveform 702. However, due to the larger time constant of the holding actuator, the activation level of the holding actuator does not fall below the actuation threshold 706.

The described embodiments include expandable materials. However, other embodiments may include contractable materials. For example, a material may be maintained in an expanded state until a downhole device is ready for activation at which point input energy can be removed to contract the material, which causes activation. While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An apparatus for operating a device in a wellbore, comprising:

at least a first and at least a second actuator activable by an input energy; and at least an operator member adapted to be moved in incremental steps by the first actuator and latched in its current position tby he second actuator, wherein the second actuator is adapted to be maintained engaged with the operator member as the first actuator moves the operator member in incremental steps.

2. The apparatus of claim 1, wherein at least one of the first and second actuators includes an actuator having an element expandable and contractable by the input energy.

3. The apparatus of claim 2, wherein the element includes a magnetostrictive material.

4. The apparatus of claim 3, wherein the input energy includes magnetic energy.

5. The apparatus of claim 1, wherein the operator member has a profile, the second actuator adapted to be maintained engaged with the profile in response to the input energy.

6. The apparatus of claim 5, wherein the profile comprises a teeth profile.

7. The apparatus of claim 1, wherein the input energy cycles on and off, the first actuator responsive to the input energy by being activated and deactivated, and the second actuator responsive to the input energy by being maintained activated.

8. An apparatus for operating a device in a wellbore, comprising:

at least a first and at least a second actuator activable by an input energy; and at least an operator member adapted to be moved in incremental steps by the first actuator and latched in its current position by the second actuator, wherein the first actuator is responsive to variation of the input energy between on and off states by activating and deactivating, and the second actuator is responsive to the variation of the input energy by remaining activated.

9. The apparatus of claim 8, wherein the first and second actuators have different frequency response characteristics and are responsive differently to the input energy cycling between on and off states at a predetermined frequency.

10. The apparatus of claim 9, wherein the first actuator has a first time constant and the second actuator has a second, larger time constant.

11. An apparatus for operating a device in a wellbore, comprising:

at least a first and at least a second actuator activable by an input energy; and at least an operator member adapted to be moved in incremental steps by the first actuator and latched in its current position by the second actuator, wherein at least one of the first and second actuators includes a solenoid actuator.

12. The apparatus of claim 11, wherein the input energy includes electrical energy.

13. The apparatus of claim 11, wherein the operator member includes an outer surface having a teeth profile engageable by the first and second actuators.

14. The apparatus of claim 13, wherein each of the first and second actuators includes a solenoid coil and an armature, the armature moveable by activation of the solenoid coil to move each of the first and second actuators into or out of engagement with the teeth profile.

15. The apparatus of claim 14, wherein the solenoid coil of the second actuator is maintained activated to maintain the second actuator engaged with the teeth profile to latch the current position of the operator member.

16. The apparatus of claim 15, wherein the solenoid coil of the first actuator is cycled between on and off states to move the operator member in incremental steps.

17. An apparatus for operating a device in a wellbore, comprising:

at least a first and at least a second actuator activable by an input energy; and at least an operator member adapted to be moved in incremental steps by the first actuator and latched in its current position by the second actuator, wherein at least one of the first and second actuators includes an actuator having an element expandable and contractable by the input energy, wherein the element includes a piezoelectric material.

18. The apparatus of claim 17, wherein the input energy includes electrical energy.

19. The apparatus of claim 17, wherein the input energy cycles on and off, the first actuator responsive to the input energy by being activated and deactivated, and the second actuator responsive to the input energy by being maintained activated.

20. An apparatus for operating a device in a wellbore, comprising:

at least a first and at least a second actuator activable by an input energy; and at least an operator member adapted to be moved in incremental steps by the first actuator and latched in its current position by the second actuator, wherein at least one of the first and second actuators includes an actuator having an element expandable and contractable by the input energy, wherein the element includes a heat-expandable material.

21. The apparatus of claim 20, wherein the input energy includes infrared energy.

22. The apparatus of claim 20, wherein the input energy includes microwave energy.

23. The apparatus of claim 20, wherein the input energy cycles on and off, the first actuator responsive to the input energy by being activated and deactivated, the second actuator responsive to the input energy by being maintained activated.

24. An actuator system comprising:

an operating actuator capable of being activated and deactivated;

a holding actuator that is maintained in an activated state; and a member engageable by the operating and holding actuators, the operating actuator adapted to move the member in incremental steps and the holding actuator adapted to maintain a current position of the member.

25. The actuator system of claim 24, wherein at least one of the operating and holding actuators includes a solenoid actuator.

26. The actuator system of claim 25, wherein the solenoid actuator includes an armature and a solenoid coil coupled to an electrical cable, the armature adapted to be moved by a magnetic force generated by the solenoid coil.

27. The actuator system of claim 21, wherein at least one of the operating and holding actuators includes an actuator including an element expandable by an input energy.

28. The actuator system of claim 27, wherein the element includes a piezoelectric material and the input energy includes electrical energy.

29. The actuator system of claim 28, further comprising conductors placed across the piezoelectric material to supply an electrical voltage across the piezoelectric material.

30. The actuator system of claim 27, wherein the element includes a magnetostrictive material.

31. The actuator system of claim 30, further comprising a mechanism adapted to generate a magnetic field proximal the magnetostrictive material.

32. The actuator system of claim 31, wherein the mechanism includes a solenoid coil.

33. The actuator system of claim 27, wherein the element includes a heat-expandable material.

34. The actuator system of claim 33, further comprising a waveguide to communicate infrared energy to the element.

35. The actuator system of claim 33, further comprising a waveguide to communicate microwave energy to the element.

36. The actuator system of claim 24, wherein the operating actuator is responsive to an input energy cycling between on and off states by activating and deactivating, and the holding actuator is responsive to the input energy by being maintained activated.

37. A string for use in a wellbore, comprising:

a downhole device; and an actuator assembly operably coupled to the downhole device, the actuator assembly including:

a first electrically activable actuator;

a second electrically activable actuator; and an operator member adapted to be moved by the first electrically activable actuator and maintained in position by the second electrically activable actuator, the first electrically activable actuator responsive to an input energy by cycling on and off, and the second electrically activable actuator responsive to the input energy by being maintained activated.

38. The apparatus of claim 37, wherein each of the first and second electrically activable actuators includes a solenoid actuator.

39. The string of claim 37, wherein the input energy comprises a signal having a frequency.

40. The string of claim 39, wherein the first electrically activable actuator has a first frequency response and the second electrically activable actuator has a second frequency response.

41. A method of operating a device having an operator member, comprising:

providing an operating actuator and a holding actuator;

alternately activating and deactivating the operating actuator to move the operator member in predetermined incremental steps; and maintaining the holding actuator activated to maintain a current position of the operator member.

42. The method of claim 41, further comprising supplying an input signal that cycles between on and off states at a predetermined frequency to the operating and holding actuators.

43. The method of claim 42, wherein providing the operating and holding actuators includes providing operating and holding actuators having different frequency responses.

44. The method of claim 42, wherein supplying the input signal includes supplying electrical energy.

45. The method of claim 42, wherein supplying the input signal includes supplying magnetic energy.

46. The method of claim 42, wherein supplying the input signal includes supplying infrared energy.

47. The method of claim 42, wherein supplying the input signal includes supplying microwave energy.

48. The method of claim 41, wherein providing the operating and holding actuators includes providing one of the following: solenoid actuators, actuators including one or more piezoelectric elements, actuators including one or more magnetostrictive elements, and actuators including heat-expandable elements.

49. An actuator apparatus for operating a device, comprising:

at least first and second actuators activable by input energy, the first actuator responsive to the input energy by cycling between energized and de-energized positions, the second actuator responsive to the input energy by remaining in an energized position; and at least one operating member adapted to be moved incrementally by the first actuator cycling between energized and de-energized positions, the operating member adapted to be held in its current position by the second actuator after each incremental movement.

* * * * *